United States Patent [19]

Terranova et al.

[11] Patent Number: 5,533,603
[45] Date of Patent: Jul. 9, 1996

[54] INTERNALLY-ACTUATING AND SELF-ADJUSTING PTO CLUTCH ASSEMBLY

[75] Inventors: Joseph C. Terranova, New Berlin; Daniel J. Nemecek, Waukesha, both of Wis.

[73] Assignee: Twin Disc, Incorporated, Racine, Wis.

[21] Appl. No.: 399,068

[22] Filed: Mar. 8, 1995

[51] Int. Cl.[6] .................................................. F16D 13/04
[52] U.S. Cl. ............................................. 192/35; 192/48.7
[58] Field of Search ........................... 192/35, 48.7, 52.1, 192/70.21, 70.25, 70.3, 99 A, 99 S, 36

[56] References Cited

U.S. PATENT DOCUMENTS

| | | | |
|---|---|---|---|
| 174,303 | 2/1876 | Reynolds. | |
| 1,210,257 | 12/1916 | Augustine | 192/52.1 |
| 1,654,911 | 1/1928 | Bartholomew | 192/52.1 X |
| 1,906,733 | 5/1933 | Bendix. | |
| 1,943,016 | 1/1934 | Hadfield | 192/75 |
| 2,008,967 | 7/1935 | Rossman | 192/35 |
| 2,085,607 | 6/1937 | Rockwell | 192/35 |
| 2,564,281 | 5/1951 | Rockwell | 192/35 |
| 2,933,171 | 4/1960 | Kraeplin | 192/35 |
| 2,940,553 | 6/1960 | Newell et al. | 188/153 |
| 3,724,619 | 4/1973 | Miller | 192/18 |
| 4,189,043 | 2/1980 | Steinhagen | 192/111 |
| 4,282,959 | 8/1981 | Schachner | 192/35 |
| 5,083,986 | 1/1992 | Teraoka et al. | 192/35 X |
| 5,333,712 | 8/1994 | Sabee et al. | 192/53 |
| 5,454,457 | 10/1995 | Sakai et al. | 192/35 |
| 5,464,084 | 11/1995 | Aoki et al. | 192/35 |
| 5,469,948 | 11/1995 | Organek et al. | 192/35 |

*Primary Examiner*—Andrea L. Pitts
*Attorney, Agent, or Firm*—Nilles & Nilles

[57] ABSTRACT

A PTO clutch assembly includes coaxial primary and secondary clutches and in use is initially externally actuated but primarily internally-actuating so as to require relatively low manual or other external actuating forces to engage the clutch assembly—the major portion of the actuating forces being imposed internally by the engine flywheel or the like after imposition of the external forces. The resulting clutch assembly, utilizing the engine flywheel for the major portion of engagement forces, requires only a fraction of the external actuating forces required by conventional over-center clutch assemblies of comparable capacity. The clutch assembly is also partially self-adjusting, with wear of the primary clutch disc stack being compensated through increased axial movement of the actuator for the primary clutch.

22 Claims, 5 Drawing Sheets

INTERNALLY-ACTUATING AND SELF-ADJUSTING PTO CLUTCH ASSEMBLY

BACKGROUND OF THE INVENTION

The invention relates to clutches and, more particularly, relates to self-adjusting, heavy-duty PTO clutches.

DISCUSSION OF THE RELATED ART

PTO clutches are well known for transferring torque from a flywheel of an internal combustion engine to a rotatable output shaft. One such clutch is disclosed in U.S. Pat. No. 4,189,043 to Steinhagen and includes a pressure plate, a manually actuated over-center linkage mechanism, and a backplate. The pressure plate is slidable axially under the operation of the over-center linkage mechanism to compress the friction disc stack between the pressure plate and the backplate, thereby non-positively coupling the output shaft to the flywheel. A self-adjust assembly is provided to compensate for friction disc wear and includes an adjusting ring threaded onto the inner end of the hub, an adjusting shaft, an adjusting worm Slidably mounted on the adjusting shaft, and an actuator. The actuator is operable automatically upon wear of the friction disc to rotate the shaft and worm and thus to engage and rotate an adjusting nut.

The PTO clutch disclosed by Steinhagen, though quite satisfactory for low and medium torque applications, has a limited torque transfer capacity. Axial length, radial width, and other dimensional restraints imposed on most PTO systems limit the size of disc stacks and thus require engagement forces to increase generally proportionally with torque. Because engagement forces are applied only externally in most clutches, manual or other external actuating forces required to engage the clutch must be increased more or less proportionally with increased torque capacity. While this does not present a problem with relatively light-duty clutches, relatively heavy-duty clutches may require the imposition of engagement forces of several thousand pounds to engage the clutch. For instance, an extremely heavy-duty clutch requiring engagement forces of 1500 lbs. would require the imposition of a 200 lb. actuating force by an operator on a 42" lever. Most operators are incapable of imposing such high forces in a safe manner. The required application forces can be reduced by increasing the length of the actuating levers, but reduction through the use of levers more than 4'–5' long is in most instances impractical. The need has therefore arisen to reduce the manual actuating forces required to engage a PTO clutch assembly without unduly increasing the size of the clutch assembly or the length of the actuating lever.

The self-adjust mechanism of Steinhagen is also rather complex to fabricate, assemble, install and operate.

PTO clutch assemblies of the type disclosed in the Steinhagen patent can be actuated more easily by providing a hydraulic or pneumatic assist mechanism which reduces the manual actuating forces required to engage the clutch. For instance, it is known to place a bladder between two faces of the clutch and to inflate the bladder to help compress the friction disc. Bladders and other, similar, clutch assist mechanisms are, however, require the application of compressed air or pressurized fluid in addition to the application of mechanical forces.

OBJECTS AND SUMMARY OF THE INVENTION

It is therefore an object of the invention to provide a PTO clutch assembly which is applied mechanically but which requires much lower manual or other external actuating forces for engagement than would be required to engage standard mechanical PTO clutch assemblies of comparable capacity.

Another object of the invention is to provide a PTO clutch assembly which meets the requirements described above without exceeding preferred dimensions.

Yet another object of the invention is to provide a PTO clutch assembly which has one or more of the characteristics described above and which is relatively simple to fabricate, assemble, and use.

Still another object of the invention is to provide a PTO clutch assembly which has one or more of the characteristics described above and which is at least partially self-adjusting.

In accordance with a first aspect of the invention, these objects are achieved by providing a power-take-off clutch assembly comprising a rotating drive element, a rotatable driven element, and coaxial primary and secondary clutches. The primary clutch has an input element coupled to the drive element and an output element coupled to the driven element. The secondary clutch is externally actuated and includes an input element coupled to the drive element and an output element. A primary clutch actuator is coupled to the output element of the secondary clutch and is responsive to engagement of the secondary clutch to engage the primary clutch under power of the drive element, thereby coupling the driven element to the drive element.

Preferably, the drive element comprises a drive ring coupled to an engine flywheel, and the driven element comprises a shaft.

The input element of the secondary clutch preferably comprises a friction disc fixed from rotation with respect to the drive ring, and the output element of the secondary clutch preferably includes an actuating plate. In this case, the secondary clutch further comprises a pressure plate which is slidable axially with respect to the shaft under the imposition of external actuating forces to compress the friction disc between the actuating plate and the pressure plate, thereby engaging the secondary clutch. The primary clutch actuator preferably comprises a hub to which the actuating plate is attached, the hub being threadedly coupled to a support and rotating on the threads to move itself and the actuating plate axially along the shaft upon engagement of the secondary clutch, thus compensating for any clutch wear and engaging the primary clutch.

In order to inhibit self-locking, a bearing assembly is disposed between the actuating plate and the primary clutch disc(s).

Yet another object of the invention is to provide a method of mechanically actuating a PTO clutch assembly using minimal external application forces.

In accordance with another aspect of the invention, this object is achieved by providing a method including manually engaging a secondary clutch of a clutch assembly to couple a rotating drive element to an actuating plate, thus driving the actuating plate to rotate and to move axially, and then engaging a primary clutch of the clutch assembly in response to axial motion of the actuating plate and under forces imposed by the drive element. This process permits the forces required to engage the secondary clutch to be less than ⅓ the forces required to engage the primary clutch, thus permitting a single operator to actuate heavy duty clutches without pneumatic or hydraulic assist. Construction can be simplified by using an axially movable and rotatable actuating plate as the output element of the secondary clutch and as the actuating element for the primary clutch.

Still another object of the invention is to provide a simple yet reliable and effective method of compensating for clutch wear.

In accordance with yet another aspect of the invention, this object is achieved by increasing the amount of axial movement of the actuating plate with increasing wear of the disc(s) of the primary clutch, thereby automatically compensating for clutch wear.

Other objects, features, and advantages of the present invention will become apparent to those skilled in the art from the following detailed description. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated from the accompanying drawings in which like reference numerals represent like parts throughout, and in which.

DETAILED DESCRIPTION OF THE PREFERRED EMBODIMENTS

1. Résumé

Pursuant to the invention, a PTO clutch assembly is provided which is initially externally actuated but primarily internally actuated so as to require relatively low manual or other external actuating forces to engage the clutch assembly—the major portion of the actuating forces being imposed internally by the engine flywheel or the like after imposition of the external forces. The clutch assembly includes primary and secondary clutches and primary and secondary clutch actuators. The secondary clutch is actuated externally and when engaged couples a rotating drive ring to the primary actuator which in turn engages the primary clutch to couple the drive ring to the PTO output shaft. The secondary clutch preferably comprises a single friction disc engaged by a sliding sleeve coupled to the secondary clutch actuator. The primary clutch actuator preferably takes the form of a threaded hub which drives an actuating plate to move axially with respect to the output shaft to compress the disc stack of the primary clutch upon engagement of the secondary clutch. The resulting clutch assembly, utilizing the engine flywheel for the major portion of engagement forces, requires only a fraction of the external actuating forces required by conventional overcenter clutch assemblies of comparable capacity. The resulting clutch assembly is also partially self-adjusting, with wear of the primary disc stack being compensated through increased rotation of the actuating plate on its threads.

2. Construction of Clutch Assembly

Referring now to the drawings, an internally actuated and self-adjusting PTO clutch assembly 10 constructed in accordance with the preferred embodiment of the invention is encased in a housing 12 and selectively couples a driven element to a drive element. The clutch assembly 10 includes a secondary clutch 14 actuated by an external actuator and a self-adjusting primary clutch 16 which is coaxial with the secondary clutch 14 and which is actuated by an internal actuator. The internal actuator is operable upon engagement of the secondary clutch 14 to couple the drive element to the driven element through the primary clutch 16. In the illustrated embodiment, the driven element comprises a rotatable shaft 18, the drive element comprises a flywheel 20 of a prime mover such as an internal combustion engine (not shown), the external actuator comprises a manually activated lever assembly 22, and the internal actuator comprises a threaded hub 24.

The lever assembly 22 is conventional and includes an actuating lever mechanism 26 and an over-center linkage mechanism 28 coupling the actuating lever mechanism 26 to the secondary clutch 14. Linkage mechanism 28 includes a sliding sleeve 30, a plurality (typically four) over-center lever arm assemblies 32, and a yoke 34. The yoke 34 is mounted on the sliding sleeve 30 by a bearing (not shown) and is pivotally connected to a crank 40 of the actuating lever mechanism 26. Each over-center lever arm assembly 32 cooperates with a sliding pressure plate 86 of the secondary clutch 14, the sliding sleeve 30, and an adjusting ring 38 in the conventional manner to drive the pressure plate 86 axially upon actuation of actuating lever mechanism 26. The actuating lever mechanism 26 includes the crank 40 and a hand-actuated lever 42 pivotally connected to trunions of the yoke 34 by the crank 40. Lever 42 includes a generally horizontal operating shaft 44 connected to the crank 40 and extending through the side wall of the housing 12, and a generally vertical shaft 46 terminating in a grip 48.

Shaft 18 is rotatably supported on the housing 12 and the flywheel 20 by bearings 50, 52, respectively. The forward end of the shaft 18 is externally splined so as to mesh with mating internal splines on a hub 64 detailed below. The rear end of the shaft 18 extends longitudinally beyond the rear of the housing 12 and may be splined or include any other suitable device for connection to a device to be driven such as the input shaft of a pump, chipper, or any other heavy duty equipment.

A drive ring 54 is provided for transferring torque from the flywheel 20 to both the primary and secondary clutches 16 and 14. In the illustrated embodiment, the drive ring 54 is formed from a unitary cast metal member and includes a front flange 56 and a body 58 extending axially rearwardly from the flange 56. The flange 56 is attached to the flywheel 20 by bolts 60. A plurality of splines 62 are formed on the inner radial periphery of the body 58 for receiving friction discs as discussed below.

The hub 64 supports the primary and secondary clutches 16 and 14 and the primary clutch actuator 24 on the shaft 18. In the illustrated embodiment, hub 64 is splined or keyed onto the shaft 18 at its inner periphery so as to be fixed from relative rotational movement with respect to the shaft 18 and is fixed from relative axial movement with respect to the shaft 18 at its rear end by a step 65 on the shaft and at its front end by a nut 66. The external surface of the hub 64 (1) has threads 67 which mate with internal threads 94 of the hub 24 as discussed below, (2) has splines 79 which receive driven plates as detailed below, and (3) is notched at its extreme rear end 69 to receive a stop ring 68.

The primary clutch 16 includes a disc stack formed from a plurality of driven plates extending radially from the hub 64 towards the drive ring 54, mating friction discs extending radially from the drive ring 54 towards the hub 64, and an actuating plate 70. The driven plates and friction discs are conventional with the driven plates comprising a fixed backplate 72 formed integral with the hub 64 and three sliding plates 74, 76, and 78 mating with the splines 79 on the hub 64 so as to be fixed from rotation with respect to the hub 64 but to be slidable axially with respect to the hub 64 and shaft 18. Three friction discs 80,82, and 84 are each flanked by a driven plate 72, 74, 76, or 78 and mesh with the splines 62 on the drive ring 54 so as to be fixed from rotation with respect to the drive ring 54 but to be slidable with respect to the drive ring 54.

The primary purpose of the secondary clutch 14 is to cause the primary clutch actuator or hub 24 to couple the drive ring 54 to the primary clutch 16 upon demand, thus permitting internal engagement of the primary clutch 16 under the control and power of the drive ring 54. Secondary clutch 14 includes the actuating plate 70, the pressure plate 86, and a friction disc 88. The pressure plate 86 is mounted on splines 90 of the hub 24, has a front face 92, and mates with the over-center linkage mechanism 28 at its rear end as discussed above. The friction disc 88 is disposed between the actuating plate 70 and the pressure plate front face 92 and has outer splines which mate with the inner splines 62 of the drive ring 54. Friction disc 88 is compressed between the front face 92 of pressure plate 86 and actuating plate 70, upon axial movement of the pressure plate 86 towards the actuating plate 70, to transfer torque from the drive ring 54 to the hub 24. In usual clutch parlance, the friction disc 88 and actuating plate 70 form input and output elements of the secondary clutch 14, and the friction discs 80, 82, and 84 and driven plates 72, 74, 76, and 78 form input and output elements of the primary clutch 16.

Hub 24 is formed as a unitary cast metal element having the actuating plate 70 formed on its front end. The splines 90 are formed on the outer periphery of the hub 24 and receive the sliding pressure plate 86 as discussed above. Threads 94 and 96 are formed on the inner and outer peripheries of hub 24 and mate with the corresponding threads 67 on the hub 64 and with corresponding threads on the adjusting ring 38, respectively. The external threads 96 and the mating threads on the adjusting ring 38 are very fine to permit precisely controlled adjustment of the ring 38 on the hub 24. The threads 94 and 67 have a rather shallow pitch but are extremely coarse for reasons detailed below.

A bearing assembly 98 is preferably provided between the front face of the actuating plate 70 and the outermost driven plate 78 of the primary clutch 16 to prevent self-locking and may, if necessary, be supplemented by return springs (not shown) disposed between the driven plates 72, 74, 76, 78. Bearing assembly 98 preferably includes a plurality of ball bearings 100 held in place by an apertured split ring assembly 102 attached to the actuating plate 70 by screws (not shown). The ball bearings 100 ride in a groove 104 formed in the front face of the actuating plate 70 and ride freely on the rear face of the rearmost driven plate 78. Alternatively, the bearing assembly could be formed from a self-lubricating bearing material adhered to the face of actuating plate 70.

3. Operation of Clutch Assembly

Figure 1:
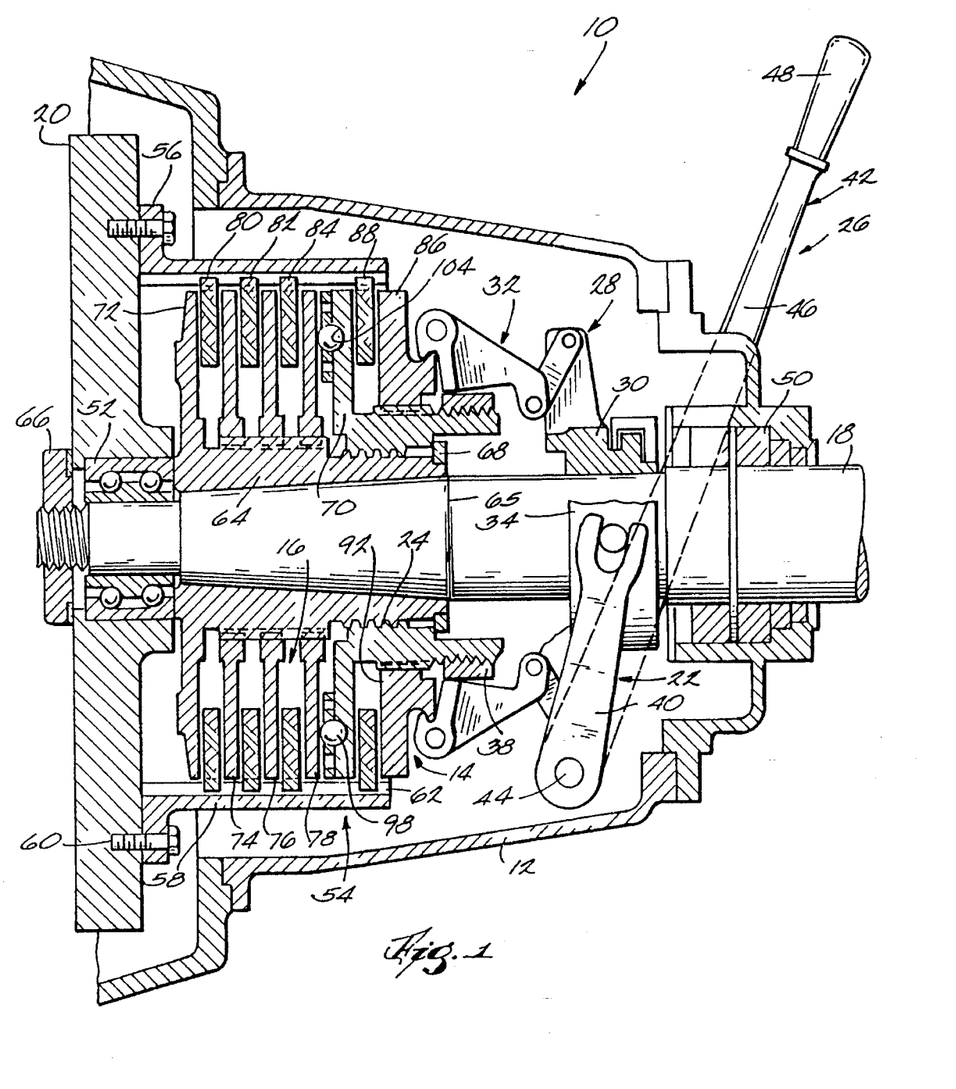
FIG. 1 is a sectional side-elevation view of a PTO clutch assembly constructed in accordance with a preferred embodiment of the invention and illustrating the clutch assembly in a disengaged position.

In use, the clutch assembly 10 is normally in its disengaged position illustrated in FIG. 1 with the lever arm assembly 26 pivoted to its rearmost position. The pressure plate 86 is accordingly positioned to the rear of the hub 24 such that the front face 92 of the pressure plate 86 is spaced from the friction disc 88 and such that the friction disc 88 is spaced from the actuating plate 70. The driven plates 72, 74, 76, 78 are likewise spaced from in the actuating plate 70 and the friction discs 80, 82, 84 at this time. Accordingly, the drive ring 54 and friction discs 80, 82, 84, and 88 rotate with the flywheel 20 without transferring any torque to the shaft 18.

Figure 2:
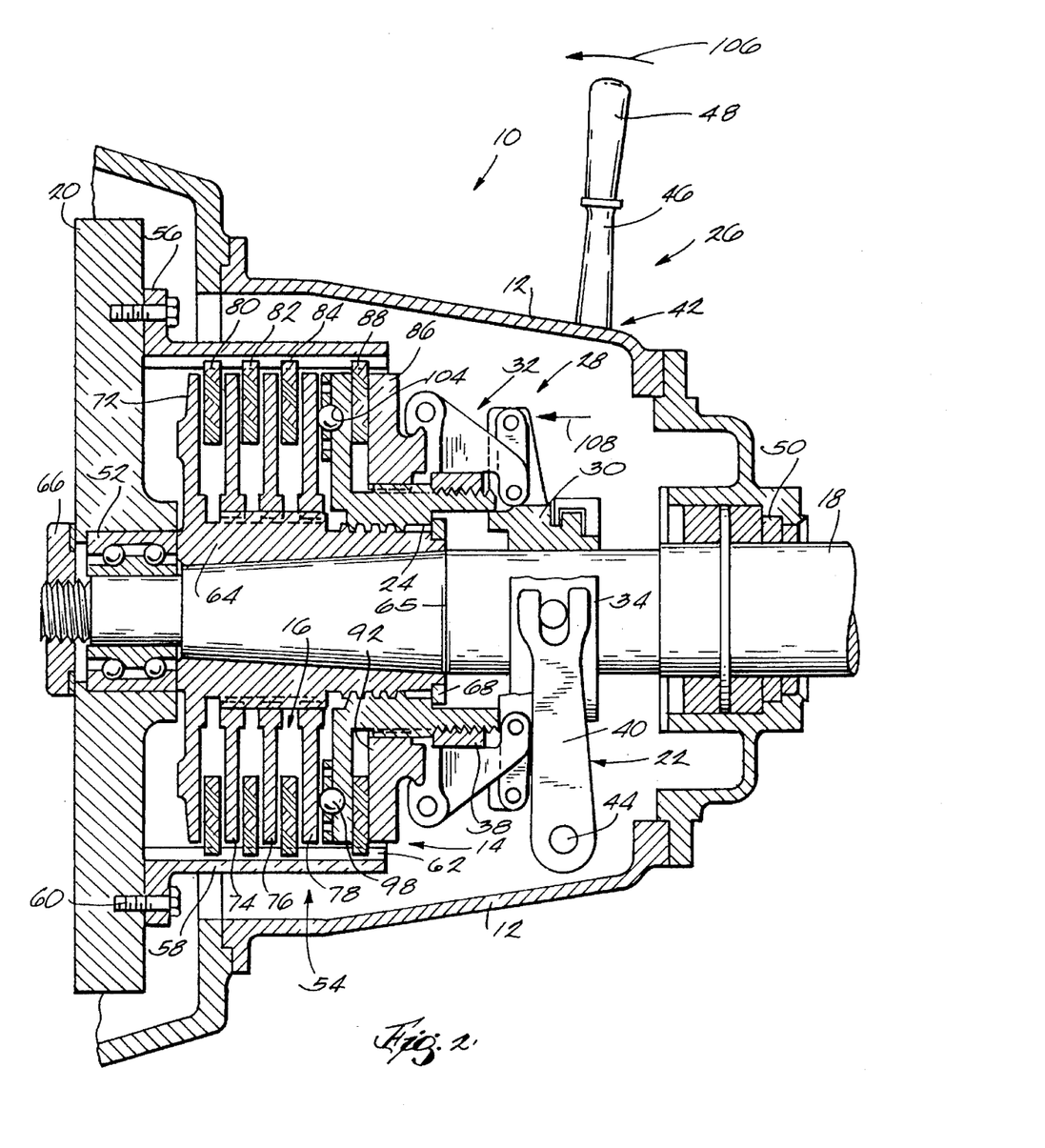
FIG. 2 corresponds to FIG. 1 and illustrates the clutch assembly in a partially engaged condition.
Figure 3:
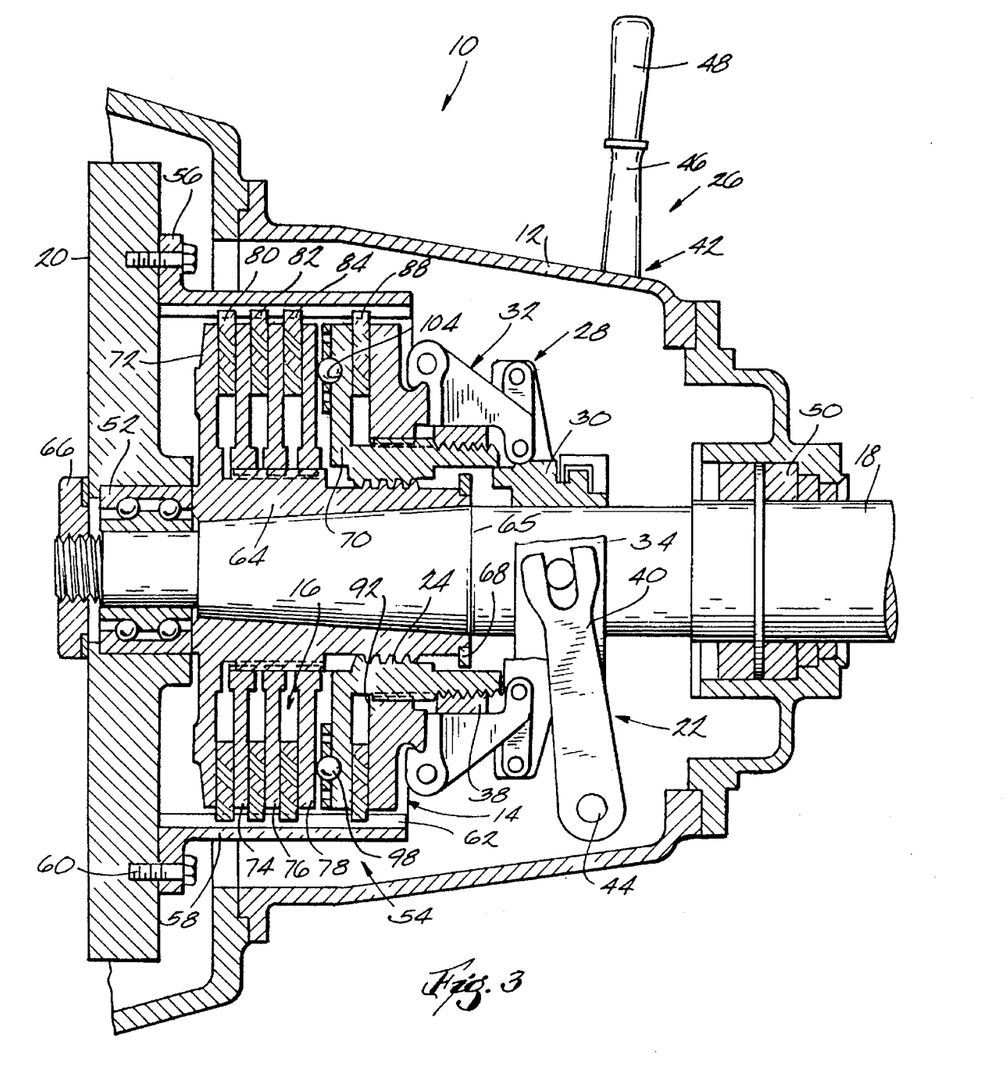
FIG. 3 corresponds to FIG. 1 and illustrates the clutch assembly in a fully engaged position.
Figure 4A:
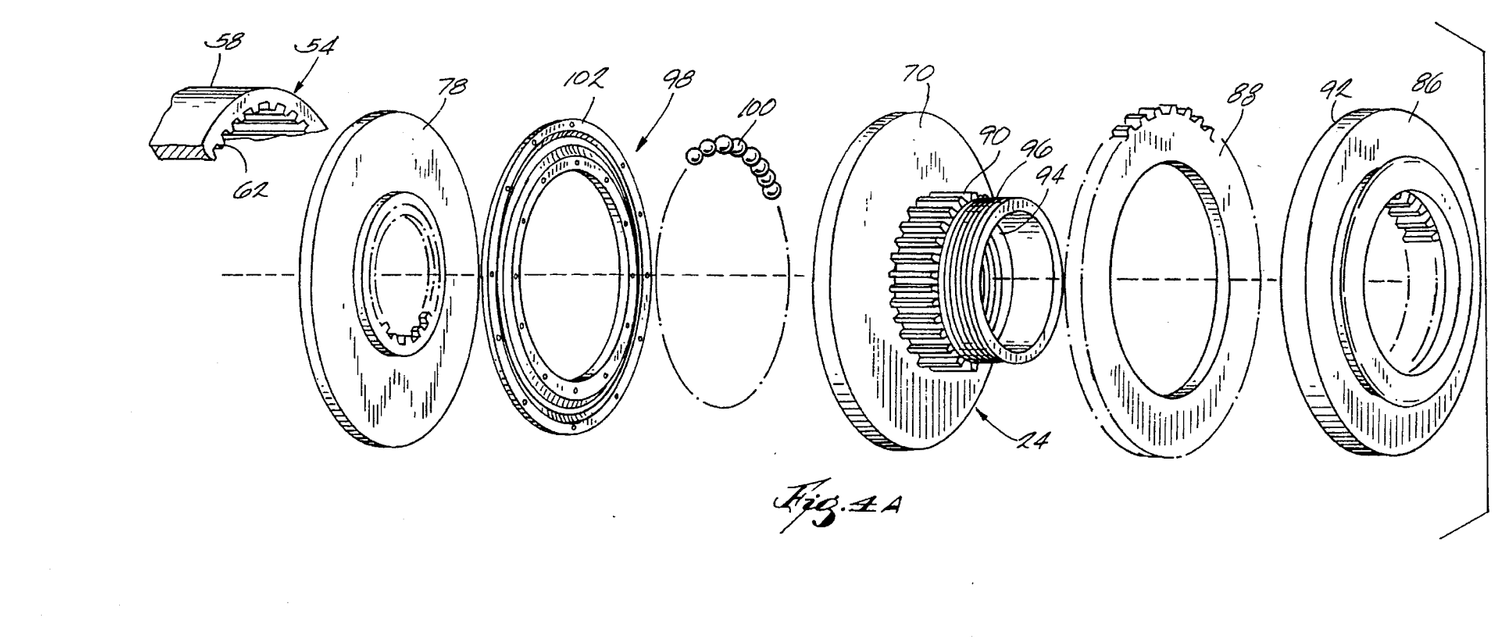
FIGS. 4A and 4B together form an exploded perspective view of a portion of the PTO clutch assembly of FIGS. 1–3.
Figure 4B:
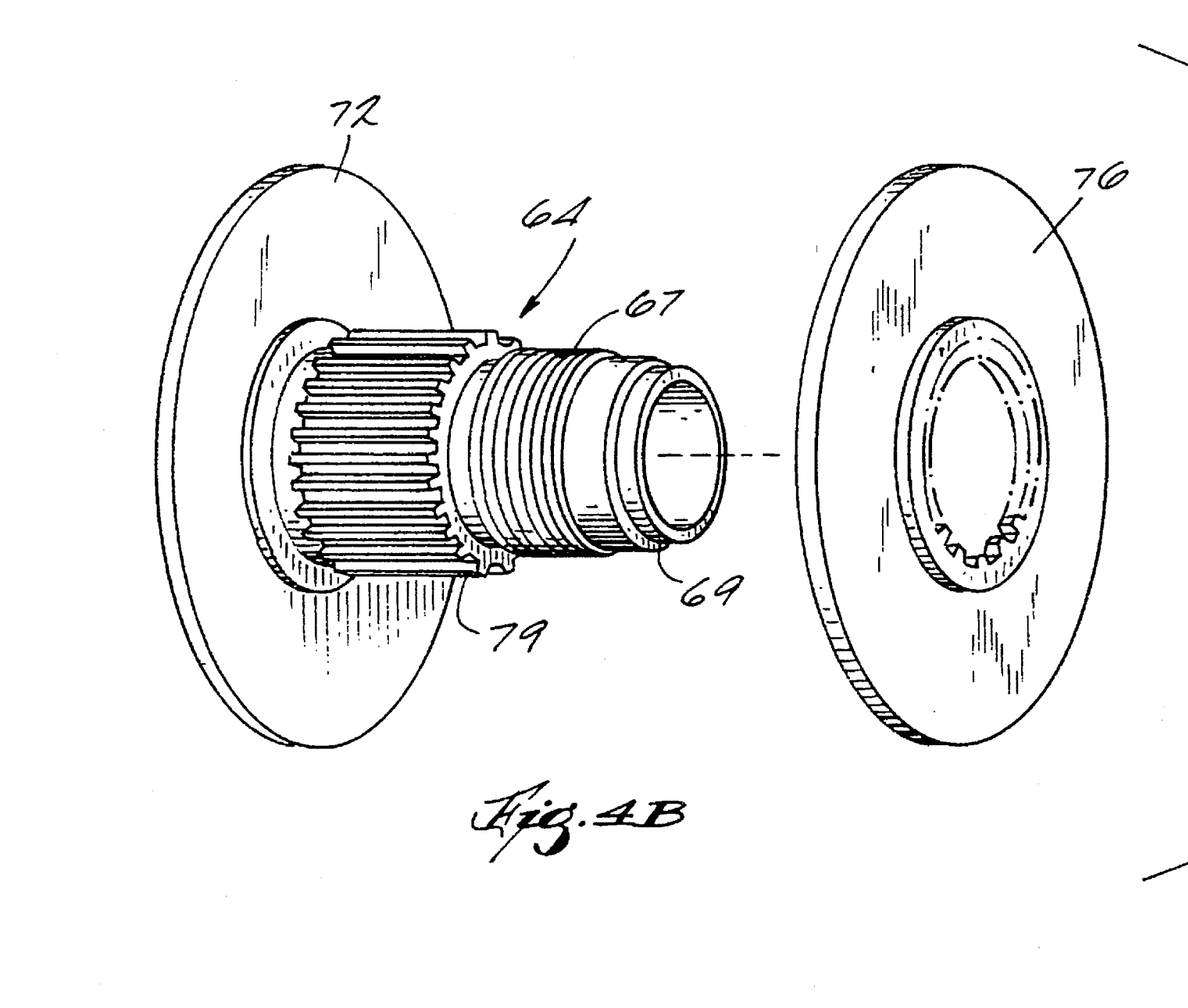

To engage the clutch assembly 10, the operator simply pivots the lever 42 in the direction of the arrow 106 in FIG. 2, thereby actuating the over-center linkage mechanism 28 and causing the pressure plate 86 to slide axially along the hub 24 in the direction of the arrow 108 to the position illustrated in FIG. 2. This motion results in compression of the disc 88 between the front face 92 of the pressure plate 86 and the actuating plate 70 and thus engagement of the secondary clutch 14. The resulting torque transfer to the hub 24 results in relative rotational movement between the hub 24 and the hub 64 and causes the hub 24 to move axially on its threads 94 from the position illustrated in FIG. 2 to the position illustrated in FIG. 3. This axial movement results in compression of the friction discs 80, 82 and 84 between the driven plates 72, 74, 76 and 78, thereby engaging the primary clutch 16 and transferring torque from the drive ring 54 to the shaft 18.

It is important to note that most of the engagement forces for the primary clutch 16 come from the drive ring 54 rather than from the actuating lever assembly 22 and thus are imposed internally by the prime mover rather than manually and externally. The forces required to actuate the secondary clutch 14 are about ⅓ those required to actuate the primary clutch 16. This internal engagement drastically reduces the manual actuating forces needed to engage the clutch assembly 10 and thus permits a clutch assembly of essentially standard dimensions to transfer much greater torque than was heretofore possible. Indeed, the clutch assembly 10 could transfer 3000 foot lbs. of torque with an 80% reduction in manual clutch engagement force. The invention thus permits the elimination of bladders, hydraulic rams, and/or other operator assist devices which would otherwise be required to engage the clutch assembly 10 and permits the use of a much shorter actuating lever 42 without employing any pneumatic or hydraulic engagement assist devices.

To disengage the clutch assembly 10, the operator simply returns the lever 42 to the position illustrated in FIG. 1, thus retracting the pressure plate 86 on the hub 24 and disengaging the secondary clutch 14. Hub 24 then turns on its threads 94 to automatically disengage the primary clutch 16. Excessive rearward movement of the hub 24 on its threads 94 upon disengagement is prevented by the stop ring 68. Self-locking of the primary clutch 16 is inhibited through the use of the bearing assembly 98 which eliminates clamping forces between the actuating plate 70 and the driven plate 78 and through the use of coarse and shallow threads 94 and 67 on the hubs 24 and 64. Self-locking can be inhibited further if necessary through the use of return springs as discussed above and/or through the use of polytetrafluoroethylene (PTFE) or some other non-stick surface on the threads 94 and 67.

4. Self-Adjust Feature

The relationship between the primary and secondary clutches 16 and 14 also permits the primary clutch 16 to be self-adjusting without utilizing any complex self-adjusting mechanisms. The primary clutch 16 is engaged by axial movement of the hub 24 and actuating plate 70 on the hub 64 through a distance determined by the compressed thickness of the disc stack (formed by the actuating plate 70, driven plates 72, 74, 76 and 78, and friction discs 80, 82 and 84). Slack resulting from friction disc wear is taken up simply and effectively through additional rotation of the hub 24 on the hub 64 upon clutch engagement and thus additional translational movement of the actuating plate 70. So long as enough "play" is provided on the external spline 90 and internal threads 94 of the hub 24, the operation of the clutch assembly 10 will not be otherwise effected by this wear compensation.

Wear of secondary clutch 14 can be accommodated if necessary in the conventional manner by manually rotating adjusting ring 38 on threads 96 to move the pivot point of the over-center linkage mechanism 28 towards the sliding pressure plate 86.

It can thus be seen that the inventive clutch assembly 10 permits the capacity of a purely mechanically actuated clutch assembly to be increased dramatically without increasing the manual forces required to engage the clutch assembly. The inventive design also permits the clutch assembly 10 to compensate for wear without requiring the use of any additional wear compensating mechanisms, thus further simplifying fabrication and operation. Of course, many changes could be made without departing from the spirit of the invention, and the scope of such changes will become apparent from the appended claims.

We claim:

1. A power-take-off clutch assembly, comprising:
   (A) a rotating drive element;
   (B) a rotatable driven element;
   (C) a primary clutch including
      (1) an input element coupled to said drive element, and
      (2) an output element coupled to said driven element;
   (D) a secondary clutch which is coaxial with said primary clutch, said secondary clutch being externally actuated and including
      (1) an input element coupled to said drive element, and
      (2) an output element;
   (E) a primary clutch actuator which is coupled to said output element of said secondary clutch and which is responsive to engagement of said secondary clutch to engage said primary clutch under power of said drive element, thereby coupling said driven element to said drive element; and
   (F) a bearing assembly disposed between said primary clutch actuator and said primary clutch and operable to prevent clutch self-locking.

2. A clutch assembly as defined in claim 1, wherein said drive element comprises a drive ring coupled to an engine flywheel, and wherein said driven element comprises a shaft on which are mounted said primary and secondary clutches.

3. A power-take-off clutch assembly comprising:
   (A) a rotating drive ring coupled to an engine flywheel;
   (B) a rotatable shaft;
   (C) a primary clutch including
      (1) an input element coupled to said drive ring; and
      (2) an output element coupled to said shaft;
   (D) a secondary clutch which is coaxial with said primary clutch, said secondary clutch being externally actuated and including
      (1) an input element coupled to said drive ring, and
      (2) an output element; and
   (E) a primary clutch actuator which is coupled to said output element of said secondary clutch and which is responsive to engagement of said secondary clutch to engage said primary clutch under power of said drive ring, thereby coupling said shaft to said drive ring, wherein (1) said input element of said secondary clutch comprises a friction disc fixed from rotation with respect to said drive ring, (2) said output element of said secondary clutch includes an actuating plate, and wherein (3) said secondary clutch further comprises a pressure plate which is slidable axially with respect to said shaft under the imposition of external actuating forces to compress said friction disc between said actuating plate and said pressure plate, thereby engaging said secondary clutch.

4. A clutch assembly as defined in claim 3, wherein said primary clutch actuator comprises a hub to which said actuating plate is attached, said hub being threadedly coupled to a support and rotating on its threads to move itself and said actuating plate axially with respect to said shaft upon engagement of said secondary clutch, thus engaging said primary clutch.

5. A clutch assembly as defined in claim 4, wherein (1) said input element of said primary clutch comprises a friction disc fixed from rotation with respect to said drive ring, and (2) said output element of said primary clutch includes a driven plate fixed from rotation with respect to said shaft.

6. A clutch assembly as defined in claim 5, further comprising a hub which is fixed to said shaft, which is attached to said driven plate, and on which said hub of said primary clutch actuator is threadedly mounted.

7. A clutch assembly as defined in claim 5, further comprising a bearing assembly disposed between said actuating plate and a driven plate of said primary clutch.

8. A clutch assembly as defined in claim 7, wherein said bearing assembly comprises a plurality of ball bearings and an annular ring assembly which holds said ball bearings in place, and wherein said actuating plate has a groove formed therein which receives said ball bearings.

9. A clutch assembly as defined in claim 4, wherein said pressure plate is slidably mounted on said hub of said primary clutch actuator, and further comprising a secondary clutch actuator which includes (1) a manually operated lever arm assembly and (2) a mechanism which is responsive to actuation of said lever arm assembly to drive said sleeve towards said actuating plate, thereby engaging said secondary clutch.

10. A clutch assembly as defined in claim 1, wherein a single actuating plate forms said output element of said secondary clutch and at least a portion of said primary clutch.

11. A clutch assembly as defined in claim 1, wherein said secondary clutch is manually actuated.

12. A power-take-off clutch assembly, comprising:
   (A) a rotating drive ring;
   (B) a rotatable shaft;
   (C) a primary clutch including
      (1) a driven plate which is fixed from rotation with respect to said shaft,
      (2) an actuating plate which is mounted on said shaft so as to be movable axially with respect to said shaft upon relative rotational movement therebetween, and
      (3) at least one friction disc which is fixed from rotation with respect to said drive ring and which is disposed between said driven plate and said actuating plate, said friction disc being operable, upon axial movement of said actuating plate towards said driven plate, to couple said actuating plate to said driven plate, thereby engaging said primary clutch; and (D) a secondary clutch which is coaxial with said primary clutch and which includes
  (1) a pressure plate which is slidable axially with respect to said shaft under the imposition of manual actuating forces,
  (2) a friction disc which is fixed from rotation with respect to said drive ring and which is disposed between said pressure plate and said actuating plate, and
  (3) said actuating plate, wherein said friction disc of said secondary clutch is operable to couple said actuating plate to said drive ring upon axial movement of said pressure plate towards said actuating plate, thereby engaging said secondary clutch and causing said actuating plate (1) to rotate relative to said shaft and (2) to move axially with respect to said shaft to engage said primary clutch.

13. A power-take-off clutch assembly, comprising:
(A) a rotating drive ring;
(B) a rotatable shaft;
(C) a first hub which is fixed to said shaft, said first hub including (1) an externally threaded rear end portion and (2) a front end portion;
(D) a primary clutch including
  (1) a plurality of driven plates which extend radially from said front end portion of said first hub and which are fixed from rotation with respect to said first hub,
  (2) an actuating plate which is fixed from rotation with respect to said shaft and which is movable axially with respect to said shaft, and
  (3) a plurality of friction discs which are fixed from rotation with respect to said drive ring and which extend radially towards said first hub;
(E) a primary clutch actuator including a second hub which is threadedly mounted on said first hub so as to be axially movable along said first hub upon relative rotational movement therebetween and on which is mounted said actuating plate;
(F) a secondary clutch which includes
  (1) a sliding pressure plate, said pressure plate being fixed from rotation with respect to said second hub and being slidable axially with respect to said second hub and said shaft under the imposition of manual actuating forces,
  (2) a friction disc which is disposed between said pressure plate and said actuating plate, which is fixed from rotation with respect to said drive ring, and which extends radially towards said second hub, and
  (3) said actuating plate, wherein said friction disc of said secondary clutch is operable to couple said actuating plate to said drive ring upon axial movement of said pressure plate towards said actuating plate, thereby engaging said secondary clutch and causing said actuating plate to rotate relative to said shaft and to move axially with respect to said shaft to engage said primary clutch;
(G) a bearing assembly disposed between said actuating plate and one of said driven plates of said primary clutch; and
(H) a secondary clutch actuator including
  (1) a manually operated lever arm assembly, and
  (2) an over-center linkage mechanism coupling said lever arm assembly to said pressure plate and operable to drive said pressure plate axially towards said actuating plate upon manual operation of said lever arm assembly.

14. A method comprising:
(A) providing a clutch assembly for coupling a rotatable shaft to a rotating drive ring, said clutch assembly including coaxial primary and secondary clutches, said primary clutch including (1) a driven plate fixed from rotation with respect to said shaft, (2) at least one friction disc fixed from rotation with respect to said drive ring, and (3) an actuating plate, said secondary clutch including (1) a pressure plate slidable axially with respect to said shaft, (2) a friction disc fixed from rotation with respect to said drive ring, and (3) said actuating plate;
(B) manually applying forces which drive said pressure plate of said secondary clutch towards said actuating plate, thereby compressing said friction disc of said secondary clutch between said pressure plate and said actuating plate and engaging said secondary clutch to rotate said actuating plate relative to said shaft via torque supplied by said drive ring; and then
(C) translating rotational movement of said actuating plate to axial movement of said actuating plate, thereby compressing said at least one friction disc between said actuating plate and said driven plate and engaging said primary clutch to rotate said shaft.

15. A method as defined in claim 14, wherein said step of translating comprises rotating said actuating plate about threads, thereby converting rotational motion of said actuating plate into translational motion.

16. A method as defined in claim 14, further comprising increasing the amount of axial movement of said actuating plate with increasing wear of said at least one disc, thereby automatically compensating for clutch wear.

17. A method as defined in claim 14, wherein the forces required to engage said secondary clutch are significantly less than the forces required to engage said primary clutch.

18. A method as defined in claim 14, further comprising disengaging said primary and secondary clutches by reversing the manual forces.

19. A power-take-off clutch assembly comprising:
(A) a rotating drive ring coupled to an engine flywheel;
(B) a rotatable shaft;
(C) a primary clutch including
  (1) a friction disc fixed from rotation with respect to said drive ring, and
  (2) an output element coupled to said shaft;
(D) an externally actuated secondary clutch which is coaxial with said primary clutch, said secondary clutch including
  (1) a friction disc which is fixed from rotation with respect to said drive ring and which is slidable axially with respect to said drive ring,
  (2) an actuating plate which is threadedly supported on said shaft and which, upon engagement of said secondary clutch, turns on its threads and moves axially towards said primary clutch, and
  (3) a secondary clutch actuator which is responsive to external actuating forces to force said friction disc of said secondary clutch into contact with said actuating plate, thereby engaging said secondary clutch and coupling said drive ring to said actuating plate to cause said actuating plate to turn on its threads and to move axially towards said primary clutch; and
(E) a primary clutch actuator which cooperates with said actuating plate and which is responsive to axial movement of said actuating plate towards said primary clutch to engage said primary clutch under power of said drive ring, thereby coupling said shaft to said drive ring.

20. A clutch assembly as defined in claim 19, wherein said friction disc of said secondary clutch is mounted on said drive ring, and wherein secondary clutch actuator comprises a pressure plate which is mounted on said shaft and which is slidable axially with respect to said shaft under the imposition of external actuating forces.

21. A clutch assembly as defined in claim 19, wherein said primary clutch actuator comprises a face of said actuating plate.

22. A clutch assembly as defined in claim 19, further comprising an externally threaded hub on which said actuating plate is threadedly mounted and which is fixed to said shaft.

* * * * *